(12) United States Patent
Moratz

(10) Patent No.: US 9,494,195 B2
(45) Date of Patent: Nov. 15, 2016

(54) MAX TYPE RADIAL BALL BEARING WITH WIRE CAGE

(71) Applicant: Schaeffler Technologies AG & Co. KG, Herzogenaurach (DE)

(72) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/869,441

(22) Filed: Sep. 29, 2015

(65) Prior Publication Data

US 2016/0102708 A1 Apr. 14, 2016

Related U.S. Application Data

(60) Provisional application No. 62/061,511, filed on Oct. 8, 2014.

(51) Int. Cl.
| F16C 33/42 | (2006.01) |
| F16C 19/06 | (2006.01) |
| F16C 43/06 | (2006.01) |

(52) U.S. Cl.
CPC ............... *F16C 33/42* (2013.01); *F16C 19/06* (2013.01); *F16C 43/065* (2013.01)

(58) Field of Classification Search
CPC ........ F16C 33/42; F16C 33/54; F16C 19/06; F16C 43/065
See application file for complete search history.

(56) References Cited

U.S. PATENT DOCUMENTS

| 449,964 A | | 4/1891 | Simonds | |
|---|---|---|---|---|
| 1,078,940 A | * | 11/1913 | Modler | F16C 19/08 384/532 |
| 1,305,875 A | * | 6/1919 | Bursell | F16C 33/42 384/534 |
| 1,361,177 A | * | 12/1920 | Peterson | F16C 19/10 384/614 |
| 1,362,097 A | * | 12/1920 | Gullbrandsson | F16C 33/41 384/525 |
| 1,783,141 A | * | 11/1930 | Russell | F16C 19/163 384/525 |
| 2,383,233 A | * | 8/1945 | Baker | F16C 19/36 384/573 |

OTHER PUBLICATIONS

Kaydon Thinfinite bearing solutions; Catalog 300; Engineering and selection guide; pp. 1, 3, and 100 (date unknown, admitted prior art).

\* cited by examiner

*Primary Examiner* — Thomas R. Hannon
(74) *Attorney, Agent, or Firm* — Volpe and Koenig, P.C.

(57) ABSTRACT

A rolling bearing assembly including a wire cage is provided. The assembly includes a radially inner ring including a first filling slot and a radially outer ring including a second filling slot. The first and second filling slots and a radial distance defined between radially inner ring and the radially outer ring are dimensioned to receive the spherical rolling elements. The wire cage includes first and second wires that extend around opposite axial sides of each of the spherical rolling elements in an alternating manner. The first and second wires overlap each other in areas between adjacent ones of the spherical rolling elements, and crimping elements affix the first and second wires together in each of the areas between the adjacent rolling elements.

6 Claims, 2 Drawing Sheets

MAX TYPE RADIAL BALL BEARING WITH WIRE CAGE

INCORPORATION BY REFERENCE

The following documents are incorporated herein by reference as if fully set forth: U.S. Provisional Patent Application No. 62/061,511 filed Oct. 8, 2014.

FIELD OF INVENTION

The present invention relates to a rolling bearing assembly, and is more particularly related to wire cage for a rolling bearing assembly.

BACKGROUND

Bearing assemblies are used in a wide range of applications, including large-scale industrial applications, such as in mining and construction equipment. In these assemblies, the spherical rolling elements are typically larger than the spherical rolling elements in other bearing assemblies and the bearing rings can include filling slots to allow insertion of the spherical rolling elements into the races through the filling slots during assembly of the bearing. These filling slots typically include matching semi-circular recesses in each of the bearing rings, and the filling slots, combined with a radial distance defined between the radially inner ring and the radially outer ring, are dimensioned to accommodate the spherical rolling elements. Cages can be provided in these bearing assemblies to prevent the rolling elements from falling out of the filling slots. Conventional cages require crossbars and prevent a maximum number of rolling elements from being inserted between the rings due to the circumferential space required by the crossbars. It would be desirable to provide a retention element for a bearing assembly including filling slots that both minimizes the circumferential space between adjacent rolling elements and retains the rolling elements from falling out of the filling slots.

SUMMARY

A rolling bearing assembly including a wire cage to prevent rolling elements from falling out of filling slots formed in bearing rings is provided. The rolling bearing assembly includes a radially inner ring defining an inner race and including a first filling slot, and a radially outer ring defining an outer race and including a second filling slot. Spherical rolling elements are supported between the radially inner ring and the radially outer ring, and the spherical rolling elements run on the inner race and the outer race. The first and second filling slots and a radial distance defined between a radially outer surface of the radially inner ring and a radially inner surface of the radially outer ring are dimensioned to receive the spherical rolling elements. A wire cage is provided that includes first and second wires that extend around opposite axial sides of each of the spherical rolling elements in an alternating manner, and the first and second wires overlap each other in areas between adjacent ones of the spherical rolling elements. Crimping elements affix the first and second wires together in the areas between the adjacent rolling elements.

A method of constructing a rolling bearing assembly with spherical rolling elements is also provided. The method includes inserting the spherical rolling elements between inner and outer bearing rings, and each of the inner and outer bearing rings include a filling slot through which the spherical rolling elements are inserted. The method includes weaving first and second wires of a wire cage around opposite sides of each of the spherical rolling elements in an alternating manner. The method includes overlapping the first and second wires with each other in areas between adjacent ones of the spherical rolling elements, inserting crimping elements in the areas between the adjacent ones of the spherical rolling elements, and fixing each of the first and second wires together with one of the crimping elements in each of the overlapping areas.

Additional embodiments are described below and in the claims.

BRIEF DESCRIPTION OF THE DRAWINGS

The foregoing Summary and the following detailed description will be better understood when read in conjunction with the appended drawings, which illustrates a preferred embodiment of the invention. In the drawings.

DETAILED DESCRIPTION OF THE PREFERRED EMBODIMENTS

Figure 1:
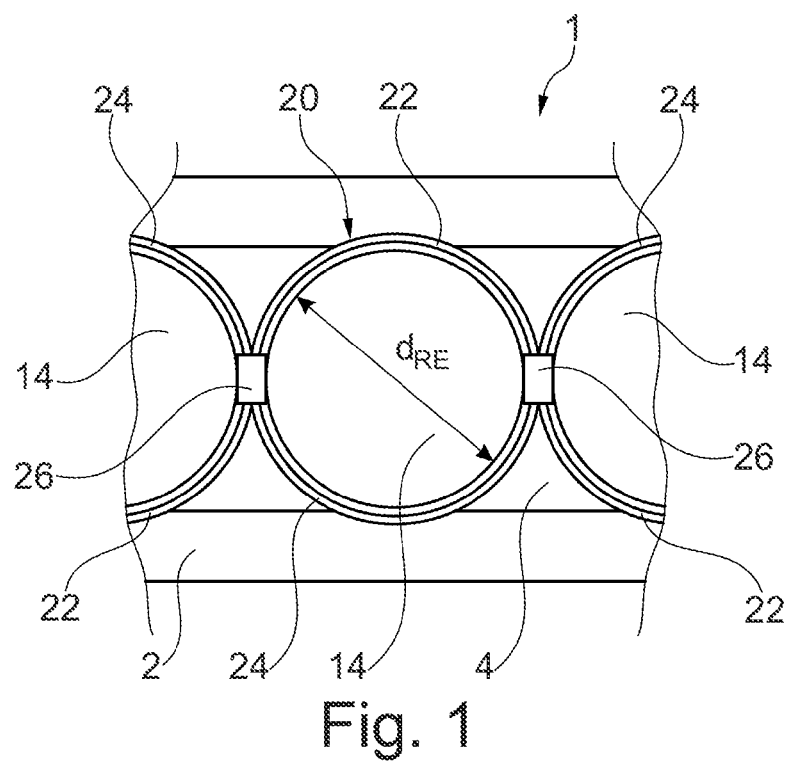
FIG. 1 shows a top view of a portion of a rolling bearing assembly without a radially outer bearing according to one embodiment.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 2:
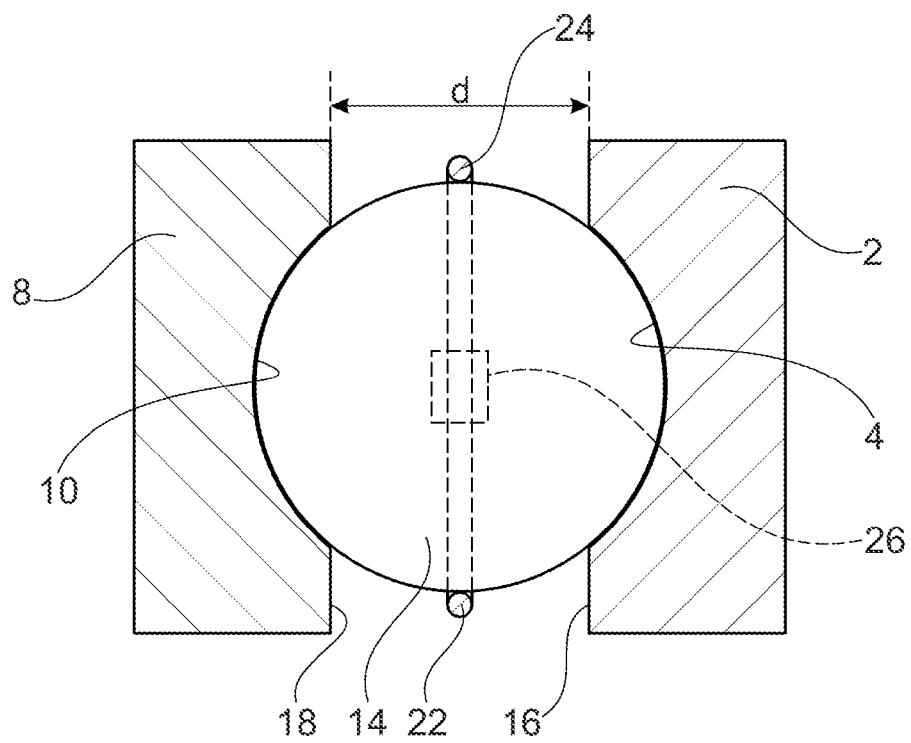
FIG. 2 shows a cross sectional view in a circumferential direction of a rolling bearing assembly according to one embodiment.
Figure 3:
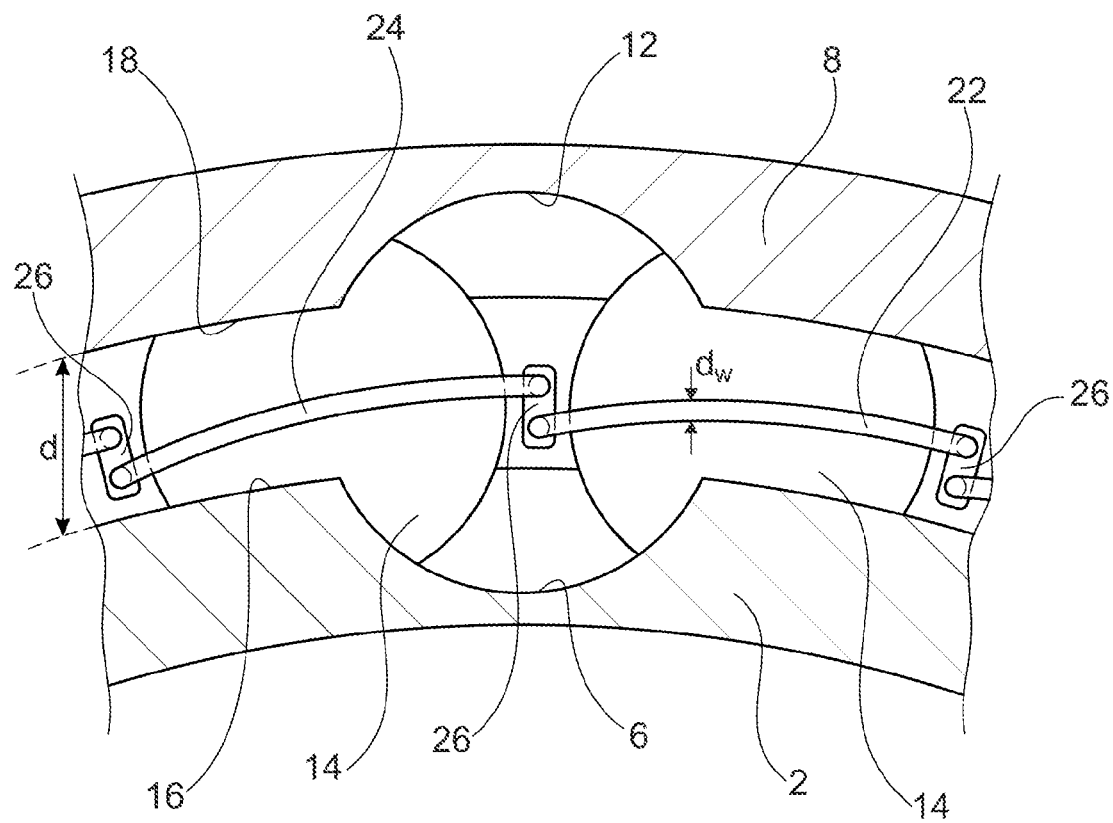
FIG. 3 shows a partial view in an axial direction of the rolling bearing assembly according to one embodiment.

As shown in FIGS. 1-3, a rolling bearing assembly 1 is provided. The rolling bearing assembly 1 includes a radially inner ring 2 defining an inner race 4 and including a first filling slot 6 (shown in FIG. 3), and a radially outer ring 8 defining an outer race 10 and including a second filling slot 12 (shown in FIG. 3). Spherical rolling elements 14 are supported between the radially inner ring 2 and the radially outer ring 8, and the spherical rolling elements 14 run on the inner race 4 and the outer race 10. As shown in FIG. 3, the first and second filling slots 6, 12 are preferably semi-circular. The first and second filling slots 6, 12 and a radial distance (d) defined between a radially outer surface 16 of the radially inner ring 2 and a radially inner surface 18 of the radially outer ring 8 are dimensioned to receive the spherical rolling elements 14. During assembly, the first and second filling slots 6, 12 are aligned with each other, and each of the spherical rolling elements 14 are manually inserted into the first and second filling slots 6, 12.

As shown in FIG. 1, a wire cage 20 includes first and second wires 22, 24 that extend around opposite axial sides of each of the spherical rolling elements 14 in an alternating manner. As shown in FIGS. 1 and 3, the first and second wires 22, 24 overlap each other in areas between adjacent ones of the spherical rolling elements 14. A crimping element 26 affixes the first and second wires 22, 24 together in the areas between the adjacent rolling elements. The crimping element 26 is preferably formed with a C or U shape and can be placed around the overlapped wires 22, 24 prior to being crimped closed. In a preferred embodiment, the crimping element 26 is formed from brass or copper. One of ordinary skill in the art will recognize that the gage of the wires 22, 24 can be varied, depending on the bearing size and the particular application.

As shown in FIGS. 2 and 3, the first and second wires 22, 24 are generally located at a pitch circle diameter of each of the spherical rolling elements 14. As shown in FIG. 2, the cage 20 formed with the first and second wires 22, 24 can slide along the axial sides of the spherical rolling elements 14, but the first and second wires 22, 24 are prevented from entering the races 4, 10 of the rings 2, 8. In one embodiment, a diameter of the first and second wires 22, 24 is 5% of a diameter of the spherical rolling elements 14.

A method of constructing a rolling bearing assembly 1 with spherical rolling elements 14 is also provided. The method includes inserting the spherical rolling elements 14 between inner and outer bearing rings 2, 8, with each of the inner and outer bearing rings 2, 8 including a filling slot 6, 12 through which the spherical rolling elements 14 are inserted. First and second wires 22, 24 of a wire cage 20 are woven around opposite sides of each of the spherical rolling elements 14 in an alternating manner. First and second wires 22, 24 are overlapped with each other in areas between adjacent ones of the spherical rolling elements 14. Crimping elements 26 are inserted in the areas between the adjacent ones of the spherical rolling elements 14, and the first and second wires 22, 24 are fixed to each other with the crimping element 26 in the overlapping areas, by crimping the crimping elements 26 closed.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A rolling bearing assembly comprising:
   a radially inner ring defining an inner race and including a first filling slot;
   a radially outer ring defining an outer race and including a second filling slot;
   spherical rolling elements supported between the radially inner ring and the radially outer ring, the spherical rolling elements running on the inner race and the outer race;
   wherein the first and second filling slots and a radial distance defined between a radially outer surface of the radially inner ring and a radially inner surface of the radially outer ring are dimensioned to receive the spherical rolling elements; and
   a wire cage including first and second wires that extend around opposite axial sides of each of the spherical rolling elements in an alternating manner, and the first and second wires overlap each other in areas between adjacent ones of the spherical rolling elements, and crimping elements affix the first and second wires together in the areas between the adjacent rolling elements.

2. The rolling bearing assembly of claim 1, wherein the first and second filling slots are semi-circular.

3. The rolling bearing assembly of claim 1, wherein the first and second wires are generally located at a pitch circle diameter of each of the spherical rolling elements.

4. The rolling bearing assembly of claim 1, wherein the crimping elements are formed from brass or copper.

5. The rolling bearing assembly of claim 1, wherein a diameter of the first and second wires is 5% of a diameter of the spherical rolling elements.

6. A method of constructing a rolling bearing assembly with spherical rolling elements, the method comprising:
   inserting the spherical rolling elements between inner and outer bearing rings, each of the inner and outer bearing rings including a filling slot through which the spherical rolling elements are inserted;
   weaving first and second wires of a wire cage around opposite sides of each of the spherical rolling elements in an alternating manner;
   overlapping the first and second wires with each other in areas between adjacent ones of the spherical rolling elements;
   inserting crimping elements in the areas between the adjacent ones of the spherical rolling elements; and
   fixing each of the first and second wires together with one of the crimping elements in each of the overlapping areas.

* * * * *